Figure 5:
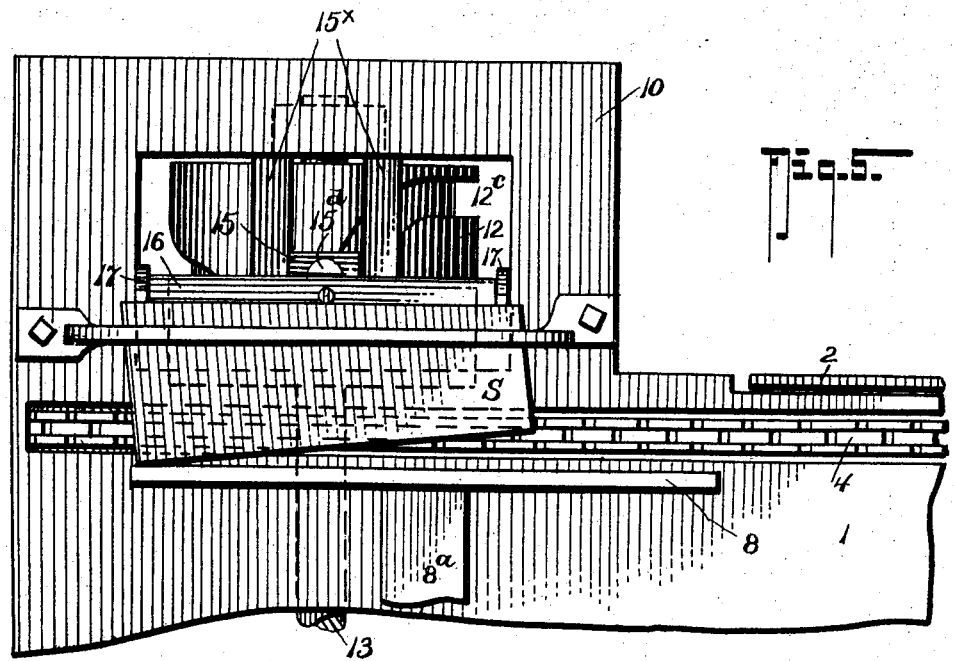

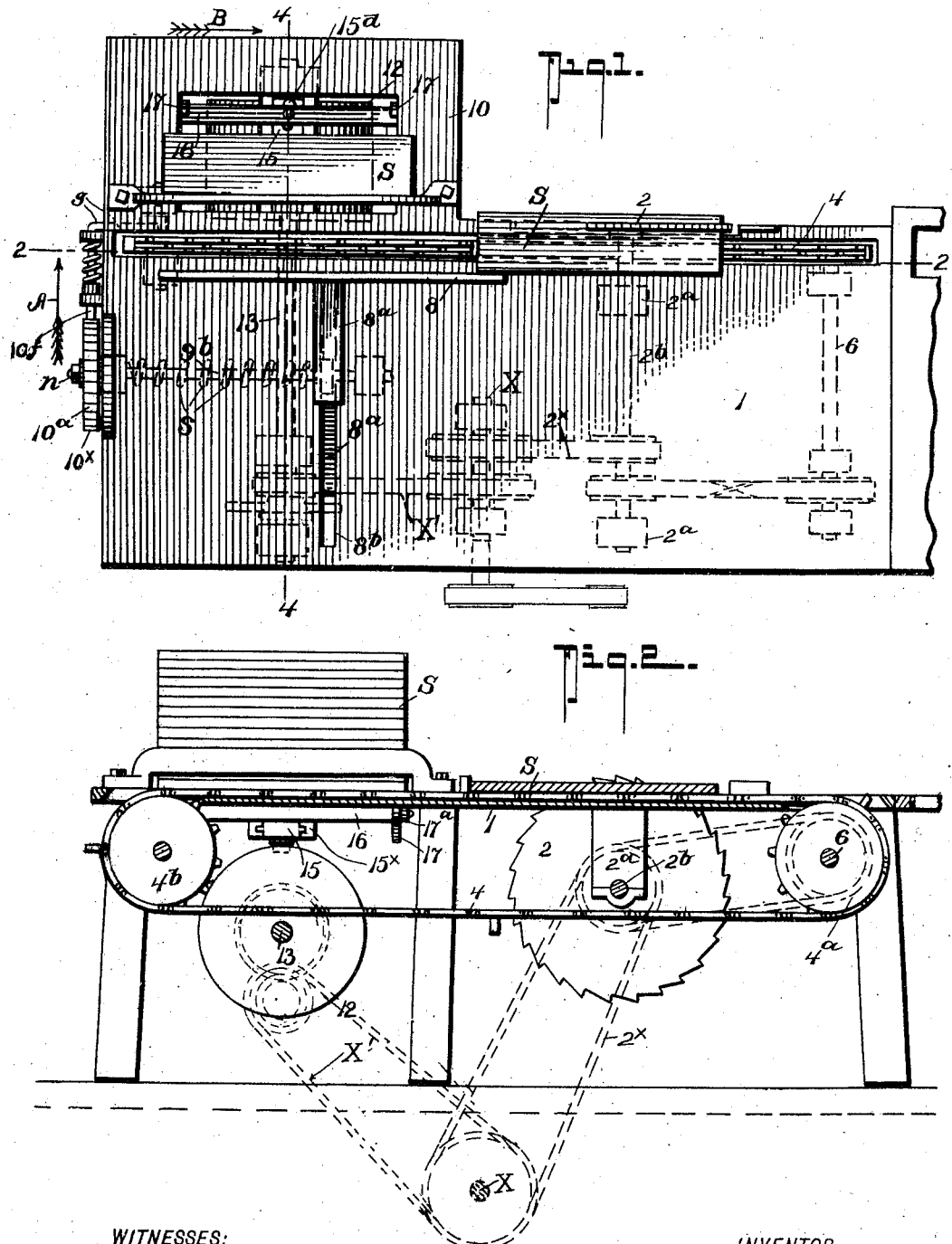

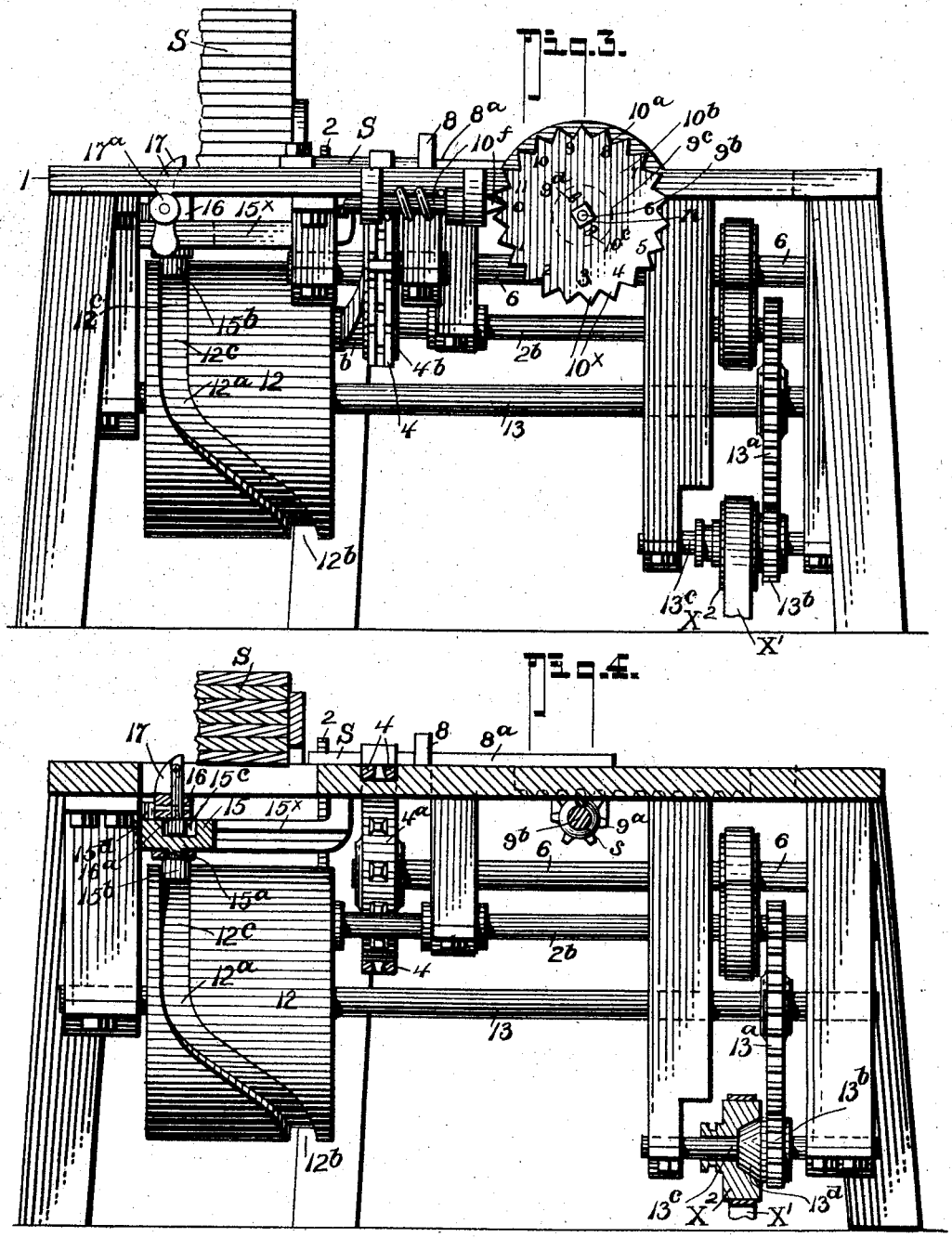

No. 767,967. PATENTED AUG. 16, 1904.
G. A. SMITH.
BOX STUFF SAWING MACHINE.
APPLICATION FILED JAN. 19, 1903.
NO MODEL. 4 SHEETS—SHEET 3.

WITNESSES:
John T. Schrott
Louis Dieterich

INVENTOR
George A. Smith.
BY
Fred G. Dieterich
ATTORNEYS.

No. 767,967. PATENTED AUG. 16, 1904.
G. A. SMITH.
BOX STUFF SAWING MACHINE.
APPLICATION FILED JAN. 19, 1903.
NO MODEL. 4 SHEETS—SHEET 4.
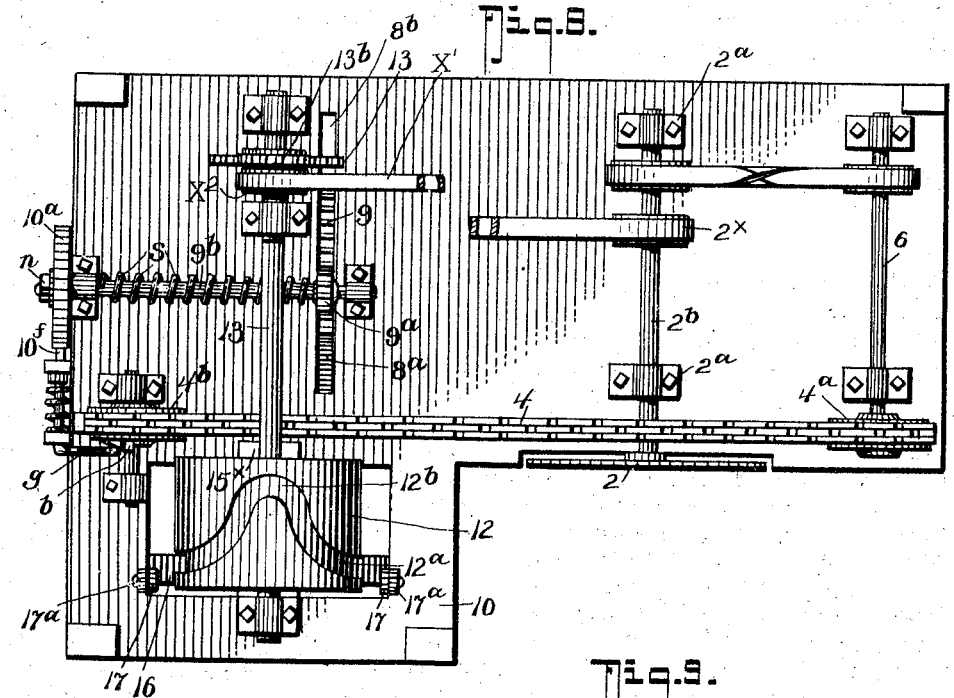
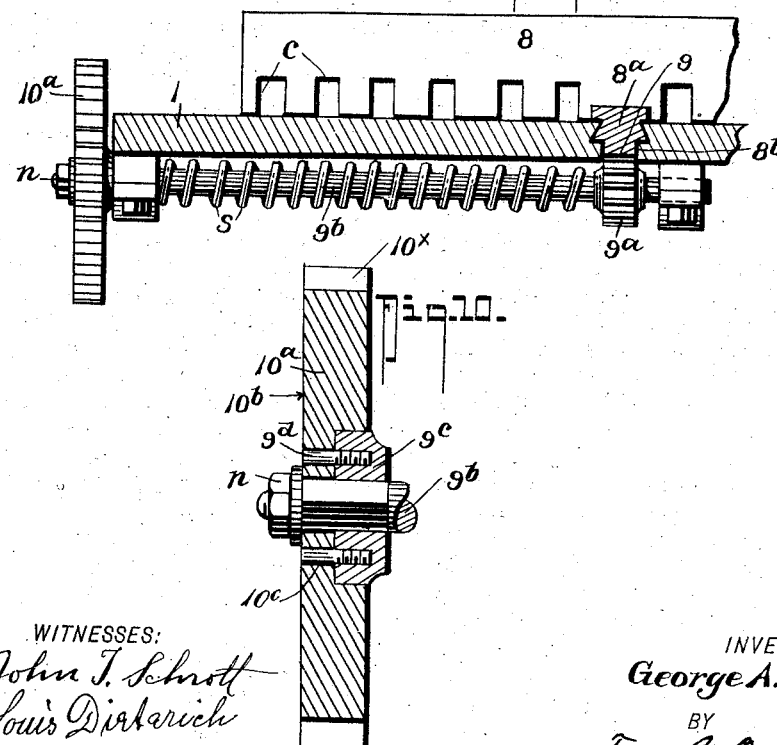
WITNESSES:
John T. Schrott
Louis Dieterich
INVENTOR
George A. Smith.
BY
Fred G. Dieterich & Co
ATTORNEYS.

No. 767,967. Patented August 16, 1904.

UNITED STATES PATENT OFFICE.

GEORGE ANDREWS SMITH, OF BELLFIELD, VIRGINIA, ASSIGNOR OF ONE-HALF TO W. F. DEAL AND H. SCHWARTZ, OF EMPORIA, VIRGINIA.

BOX-STUFF-SAWING MACHINE.

SPECIFICATION forming part of Letters Patent No. 767,967, dated August 16, 1904.

Application filed January 19, 1903. Serial No. 139,634. (No model.)

*To all whom it may concern:*

Be it known that I, GEORGE ANDREWS SMITH, residing at Bellfield, in the county of Greensville and State of Virginia, have invented certain new and useful Improvements in Box-Stuff-Sawing Machines, of which the following is a specification.

My present invention relates to improvements in that class of mechanism employed for edging box-timber and rendering the same of uniform widths; and it particularly seeks to provide certain improvements on the construction of machine disclosed in another application filed by me, Serial No. 107,079, allowed September 24, 1902.

In my other application I have disclosed and shown a machine for trimming box-boards of irregular widths and which are trimmed to uniform widths proportionate to the sizes of the stock when fed to the saws and in which is included means for automatically feeding the stock to the saws and for gaging the different width pieces and which in its generic construction embodies a gage parallel with the saw automatically shiftable by the pressure thereagainst of the stock to be trimmed and means for automatically feeding the stock on to a conveyer against the gage coöperatively connected with the saws, the conveyer and the operating means therefor, an automatically-operating detent for holding the gage or fence at predetermined times, and a tripping means therefor being also included in the mechanism disclosed in my other application referred to.

My present invention primarily has for its object to simplify the construction of the machine referred to and to render the operation thereof positive, accurate, one of easy manipulation and of increased capacity; and to such ends my present invention comprehends, first, an improved construction of gage or fence device especially designed to prevent the accumulation of sawdust or other waste between the opposing surfaces of the fence and the edge of the stock moved thereagainst; second, an improved arrangement of gage or fence adjusting and regulating means in which is included a rotary dial or indicator member, a latch for holding it to its adjusting position, and trip devices controlled by a chain-shaft for releasing the latch at predetermined times; third, an improved actuating means for the feeding-shaft, comprising clutch members peculiarly arranged whereby the said shaft can be readily thrown out of operation without stopping the saws and the conveyer-actuating means; fourth, an improved construction of pusher devices for feeding the stock on the conveyer and into the direction of the fence or gage.

In its more subordinate features my invention consists in certain details of construction and peculiar combination of parts, all of which will hereinafter be fully explained, and specifically pointed out in the appended claims, reference being had to the accompanying drawings, in which—

Figure 6:
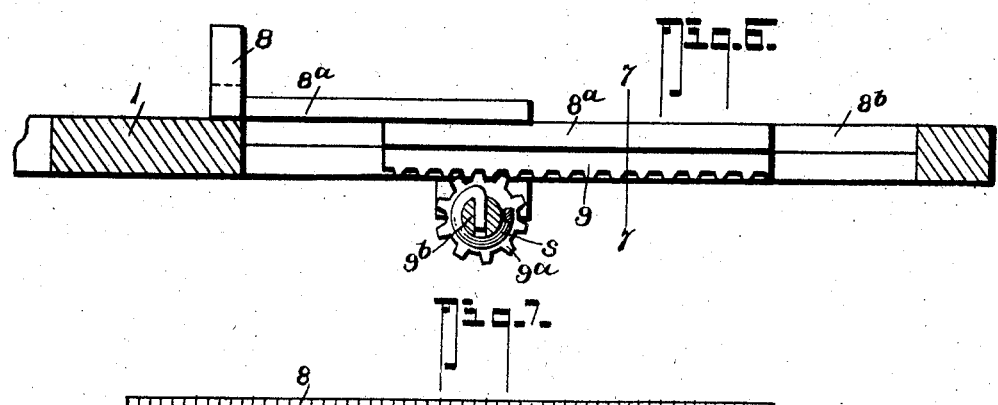
Figure 7:
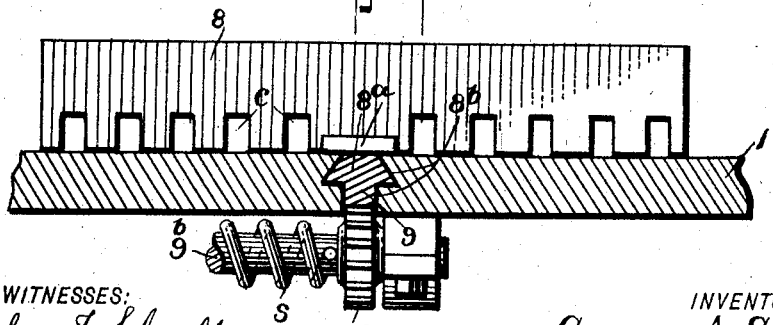

Figure 1 is a top plan view of my improved machine. Fig. 2 is a vertical longitudinal section thereof, taken practically on the line 2 2 of Fig. 1 looking in the direction of the arrow A. Fig. 3 is an end elevation thereof, parts being in section. Fig. 4 is a transverse section of the same on the line 4 4 of Fig. 1 looking in the direction of the arrow B. Fig. 5 is a diagrammatic plan view illustrating the feed devices for bringing the boards onto the conveyer and showing how said devices appear to move boards of tapering or irregular widths into a proper alinement with the fence or gage. Fig. 6 is a detail view of parts of the said mechanism hereinafter explained. Fig. 7 is a cross-section thereof on the line 7 7 of Fig. 6. Fig. 8 is an inverted plan view of my machine, parts being in section. Fig. 9 is a detail view of the fence or gage member. Fig. 10 is a detail view of the cam-wheel and the pusher-pawl-holding bar coöperatively joined therewith.

In my present invention the general arrangement of the saw, the conveyer, the cam-shaft, the pusher devices, and the fence or gage is substantially the same as in the machine disclosed in my other application referred to.

In my present construction the saw mandrel or shaft $2^b$, journaled in the boxes $2^a\ 2^a$ under the table 1, is driven by a belt $2^x$, which extends up from a main or counter shaft X, and the latter shaft X in my present structure conveys motion to the clutch-carrying-shaft by a belt X' in a manner presently more fully explained. The endless-chain carrier 4 passes over a sprocket-wheel 4ª on a shaft 6, mounted at the discharge end of the table 1, and over a sprocket-wheel 4ᵇ at the other end of the table, and which in my present arrangement is an idler-wheel, and the shaft 6 is driven by the crossed belt which takes around a pulley on the saw-shaft, as shown.

The boards, (indicated by S,) which are usually of varying widths, are stacked on the extension 10 on the front end of the table, with their inner edges substantially in the longitudinal plane of the saw. (See Fig. 1.) When the boxes to be made have a side, say, fourteen inches in height, the minimum width of stuff used is four and one-half inches and the maximum width of said stuff nine and one-half inches. To obtain a maximum width from pieces of substantially the size stated, a fence or gage coöperates with the saws and the means that feed the stuff onto the conveyer-chain, and to render the operation and purpose of my invention clear it should be stated that the adjustment of the gage or fence is automatically controlled by the stock to be trimmed. For example, should the stock-piece brought into the position on the conveyer to be trimmed be more than four and one-half inches and less than five inches the fence or gage will be automatically set to hold the said stock-piece in such manner that it will be trimmed to four and one-half inches wide.

The fence or gage member 8 in my improved construction projects vertically from the table at a point opposing the lumber stack S and in a plane parallel with the trimmer-saw 2, and the distance that the face of the said gage is set back from the cutting edge of the saw 2 depends upon the width of the boards to be trimmed. The gage or fence 8 is also yieldingly mounted and has a base 8ª movable in the slotway 8ᵇ in the table, and it is normally moved in the direction of the conveyer-chain 4 under spring action in the manner presently referred to. The member 8ª of the gage is provided with a rack portion 9, which engages a small pinion 9ª, whose diameter in practice is preferably three inches, and the said pinion is mounted on the inner end of the short shaft 9ᵇ, parallel with the gage-board 8, which extends to the front end of the table, is mounted in suitable bearings on the under side of the table, and carries at its outer end a disk 9ᶜ, as clearly shown in Figs. 3, 9, and 10, by reference to which it will also be seen a large disk 10ª, having a dial-face 10ᵇ, is mounted on the small hub or disk 9ᶜ, and the two disks 10ª and 9ᶜ are fixedly secured upon the outer end of the shaft 9ᵇ by the clamp-nut n, as shown, and to provide for a limited rotary adjustment on the shaft 9ᵇ, for reasons presently explained, the disk 10ª has diametrically oppositely disposed slots 10ᶜ concentric with the axis of the shaft 9ᵇ, which receive studs 9ᵈ on the disk 9ᶜ. The disk member 10 in practice is twice the diameter of the pinion 9ª and has its teeth 10ˣ on its periphery spaced proportionately to the teeth on the pinion 9ª, such relative diameters of the disk and pinion being provided to facilitate and render the setting of the gage easy and accurate.

By arranging the gage-setting devices in the manner stated it is obvious that as the boards are pushed singly outward onto the conveyer in a manner presently stated and against the fence or gage member the shaft 9ᵇ is rotated by the rack-and-pinion connections and the disk 10ª is correspondingly rotated, the amount of its rotation depending upon the width of the board being operated on. For example, should the board be between four and one-half and five inches the disk 10ª will be turned until the dial registers four and one-half inches, at which point it will then be held by the spring-actuated pawl or detent 10ᶠ, which automatically engages the ratchet-teeth on the disk 10ª.

While I have described the relative stepping off of the teeth on the disk 10ª and the pinion 9ª to permit the predetermined movements of the gage H, say, in half-inches, it is manifest that the teeth upon the disk 10ª may be of other proportionate sizes to permit of trimming stuff having widths intermediate the one-half-inch differences, and by providing for a slight adjustment of the disk 10ª, rotatable with respect to the shaft 9ᵇ, a compensating means for the wear of the parts and for obtaining an absolutely accurate adjustment thereof is acquired. Furthermore, by using a disk 10ª, as shown, for regulating the holding of the gage to its back-pressed positions interchangeable disks 10ª, having different but relatively-arranged tooth-peripheries to provide for trimming boards of larger or smaller widths than heretofore specified, may be readily employed.

To return the gage 8 to its normal position when the pawl 10ᶠ is withdrawn at predetermined times, as presently explained, a torsion-spring s is mounted upon shaft 9ᵇ, as shown. The pawl 10ᶠ extends along the outer edge of the table (see Fig. 3) and has its outer end terminate in an upwardly-projecting finger g, so disposed relatively to the idler chain-wheel 4ᵇ as to be engaged at predetermined times by a cam b on the said wheel 4ᵇ and be thereby shifted, so its inner or pawl end is moved out of engagement with the disk 10ª to permit the automatic return of the gage 8, which operation occurs immediately after the rear end of the board being trimmed passes out of contact with the gage member 8.

In the practical use of the machine referred to in my other application stated I have found that in feeding the boards against the gage member 8 a gathering of waste—such as sawdust, chips, &c.—between the opposing surfaces of the board and the gage member 8 prevents an accurate setting of the board against the gage and with respect to the saws, and hence an irregular trimming of the stock. This very objectionable feature I have positively overcome by forming that portion of the gage member 8 which the board edge engages with notches $c$ $c$, (see Fig. 9,) which allows the dust or waste particles being pushed through the end portion of the gage member 8, and thereby allows the board edge to lie solid and flat against the gage. This feature of my invention is an important one, as it reduces the danger of irregular trimming of the boards to the minimum.

In lieu of the crank-shaft devices described in my other application referred to, which form a part of the feed mechanism that moves the boards edgewise on to the conveyer, I provide a shaft 13, journaled transversely under the table in suitable bearings, and upon one end of which is mounted a cam-disk 12, in practice of eighteen inches diameter, when the machine is adapted for trimming boards having the widths before referred to, and the said disk has a cam-groove $12^a$ in its periphery, arranged to impart a twelve-inch reciprocation of the board-feeding devices presently explained. The cam-groove $12^a$ in the construction shown consists of a V-shaped portion $12^b$ and a straight portion $12^c$, the latter extending one-half the circumference of the disk, whereby the reciprocal motion of the pusher devices is effected during a half-revolution of the shaft 13 and the said fingers remain inert during the other half-revolution of the said shaft 13 and during the time in which the board last fed into position is being trimmed. While I have shown and described the cam-groove $12^a$ as comprising portions relatively arranged to effect a reciprocating action of the pusher-fingers at each alternate one-half revolution of the shaft 13, it is obvious the co-relative arrangement of the parts constituting the complete cam-groove and the diameter of the disk 12 may be such as to effect the reciprocating operation of the fingers during a greater or a less amount of rotation of the shaft 13 to suit the width of the stuff to be trimmed. The shaft 13 in my present construction is driven independently of the saw-shaft, but from the same counter-shaft that imparts motion to the saw-shaft to permit of radially throwing the shaft 13 out of gear with the driver-shaft. The said shaft 13 has a gear $13^a$, which meshes with a pinion $13^b$ on a stub-axle $13^c$, mounted on the main frame under the shaft 13 and on which is also mounted a slidable cone-clutch $X^2$, around which takes a drive-belt $X'$, which coacts with the clutch-cone $13^d$ on the pinion $13^b$, as clearly shown in Fig. 4, by reference to which it will be readily seen that by shifting the clutch $X^2$ from contact with its mate, $13^d$, the feed mechanism can be stopped without interfering with the action of the saw-conveyer chain. The pusher devices actuated by the cam-disk 12 drive a metal plate 15, horizontally slidable in guideways $15^x$ $15^x$ on the under side of the table, and the said plate has a pendent stud $15^a$, which carries a friction-roller $15^b$, adapted to engage and ride in the cam-groove in the disk 12, as clearly shown in Fig. 4. The plate 15 has a longitudinal slot $15^c$ to receive a fulcrum stud $16^a$, which is adjustably secured in the said slot and forms a central bearing member or finger for engaging the outer edge of the undermost board in the pack to be moved out on to the conveyer-chain, and 16 designates an arm supported upon the member 15, with its rear edge rockably engaging the squared edge of a stud $15^d$, projected up from the plate 15, as best shown in Figs. 1 and 3. 17 17 designate pusher-fingers, one at each end of the arm 16, suitably connected to the arm in such manner that they will automatically move out of an operating position and slide under the stack of boards S as they and the arms 16 move back to their board-gripping position, and to maintain the said fingers in a proper vertical position while pushing the board outward and to facilitate the travel of the arm and the fingers forward the lower ends of the said fingers carry laterally-projected friction-rollers $17^a$ $17^a$ for engaging the under side of the table edge adjacent the ends of the arms 16.

In the practical operation of my present machine the stock is preferably worked in stacks of substantially uniform widths, and to provide for shifting boards of the maximum predetermined widths the reciprocal movement of the member 16 by the cam-disk 12 is regulated accordingly, as before stated.

Assuming the boards in the stack S to be not less than five or over five and one-half inches wide, the pusher-fingers 17 will move inward some distance before engaging the lowermost board and then move the board outward upon the conveyer-chain 4 against the gage member 8, which member then recedes by the pressure of the board against it to a predetermined distance—which, for example, may be five inches back from the trimmer-saw—at which point the said member 8 will be held by the pawl that engages the dial-ratchet on the shaft $9^b$ during the operation of feeding the board forward to the saws by the conveyer-chain, which chain, it should be stated, has its pusher-lugs for engaging the rear edge of the board so spaced relatively to the feeding device as to engage the board and push it upward toward the saw immediately after it has been fed forward and set by the pressure devices and gage-operating mechanism.

During the operation of feeding the board on to the saw to be trimmed the gage 8 is held stationary, and the pusher devices are maintained at their rearmost position by reason of the lug 15ª now engaging the straight grooveway in the cam-disk 12; but as soon as the rear end of the board being trimmed passes beyond the gage member 8 the cam $b$ on the idler-wheel $4^b$ will trip the pawl, and thereby allow the gage devices to automatically return toward the conveyer-chain, and it is deemed proper to here state that prior to the release of the gage 8 the cam-disk 12 will be again starting the pusher devices forward to engage the next lowermost board.

By providing a central fulcrum-finger rockably supporting the arm 16 on the casting 15 a simplified means is provided for moving rough boards of tapering widths in to a solid alinement with the gage or fence 8. In this feature my present invention differs from the like feature in my other application in the improved details of construction only and hereinbefore described, and the manner of operation of which will be readily understood by referring to Fig. 1 of the drawings.

From the foregoing description, taken in connection with the accompanying drawings, the complete operation of my invention will be readily understood, the operation being entirely automatic, and an unskilled operator can control and feed a number of machines, and by reason of the uniform differences of board widths they can be quickly matched to produce the full width of the box side desired with a minimum waste of material.

Having thus described my invention, what I claim, and desire to secure by Letters Patent, is—

1. In a machine of the class described, a conveyer-chain, a fence or gage, yieldingly movable with respect to the trimming-saw and adapted to be set by the pressure on the stock fed against it and in proportion to the width of said stock; in combination with means for temporarily holding the gage or fence to its set positions, said means including a rack and a coacting pinion-equipped shaft, ratcheted dial-disks for interchangeably engaging the said shaft, a pawl for engaging the said disks and holding the disk-shaft to its automatically-shifted positions, and a trip device under control of the conveyer-chain for releasing the said pawl at predetermined times, as set forth.

2. In a box-stuff-trimming machine, a means for automatically feeding the board to be trimmed into position to be conveyed to the saw, a gage or fence opposing said feed mechanism yieldingly supported and adapted to be held relatively to the saw and proportionately to the board to be trimmed by the contact of the said board therewith, a detent mechanism for holding the gage to its adjusted position, said mechanism including a rack carried by the fence or gage, a shaft carrying a pinion at one end for engaging the rack, a toothed dial-disk on the other end of the shaft, a spring-actuated pawl for engaging the toothed dial-disk, and a tripper controlled by the conveyer for releasing the pawl from the toothed dial-disk at predetermined intervals, as set forth.

3. In a machine of the character described, an intermittently-operating means for pushing the board on to the conveyer, said means including a continuously-rotating shaft, an arm having members for engaging the board edge, a cam on the continuously-rotating shaft having a groove V-shaped a portion of its length and straight the remainder of its length, a stud on the arm for engaging the cam-disk groove, the said arm having a central bearing whereby to rock to a limited extent in a horizontal plane, as set forth.

4. In a machine of the character described, in which is included a conveyer and a fence or gage automatically movable to its normal position and adapted to be set by the pressure of the stock moved against it; in combination with a means for temporarily holding the gage or fence to its said positions, including the shaft $9^b$, the fixedly-held disk $9^c$, the disk $10^a$ mounted on the disk $9^c$ having limited rotation relatively to the shaft, said disk $10^a$ having an arbitrarily-spaced notched or toothed periphery, a pinion on the shaft $9^b$, a rack portion attached to the gage or fence to mesh with the said pinion, a pawl for engaging the toothed periphery of the disk $10^a$ and a tripper under control of the conveyer for releasing the pawl from the disk $10^a$ at predetermined intervals, as set forth.

GEORGE ANDREWS SMITH.

Witnesses:
HENRY MACLIN,
F. A. LEWIS.